United States Patent [19]

Wilkerson

[11] 4,200,833
[45] Apr. 29, 1980

[54] POWER MAXIMIZATION CIRCUIT

[76] Inventor: Alan W. Wilkerson, 410 Madero Dr., Thiensville, Wis. 53092

[21] Appl. No.: 846,912

[22] Filed: Oct. 31, 1977

[51] Int. Cl.$^2$ .......................... G05F 1/66; G05F 5/00
[52] U.S. Cl. ............................. 323/20; 323/22 SC; 363/135
[58] Field of Search .................. 323/1, 4, 20, 22 SC, 323/DIG. 1; 363/123, 135

[56] References Cited

U.S. PATENT DOCUMENTS 3,952,240   4/1976   Ruumpol ............................. 323/1

OTHER PUBLICATIONS

DeBrita et al., "Integrated Binary Power Controller," IBMTDB, vol. 17, No. 8, Jan. 1975, pp. 2227–2229.

*Primary Examiner*—A. D. Pellinen
*Attorney, Agent, or Firm*—Andrus, Sceales, Starke & Sawall

[57] ABSTRACT

A power maximization circuit periodically samples the output power of a power supply to regulate output voltage or current toward that resulting in maximum output power. Power increasing variations in voltage or current are continued until maximum power is reached and exceeded, at which time the direction of variation is reversed until operation becomes stabilized at maximum power conditions. The circuit includes a sampling means for periodically sampling the output power. The sampling means is connected to a comparison means providing an output signal, the condition of which is indicative of whether the power at any given sampling period is greater or less than the previous sampling period. Means are provided for detecting on a coincidence basis, the condition of the comparison means output signal and for altering the magnitude of the current or voltage of the power supply toward that which obtains maximum power.

3 Claims, 4 Drawing Figures

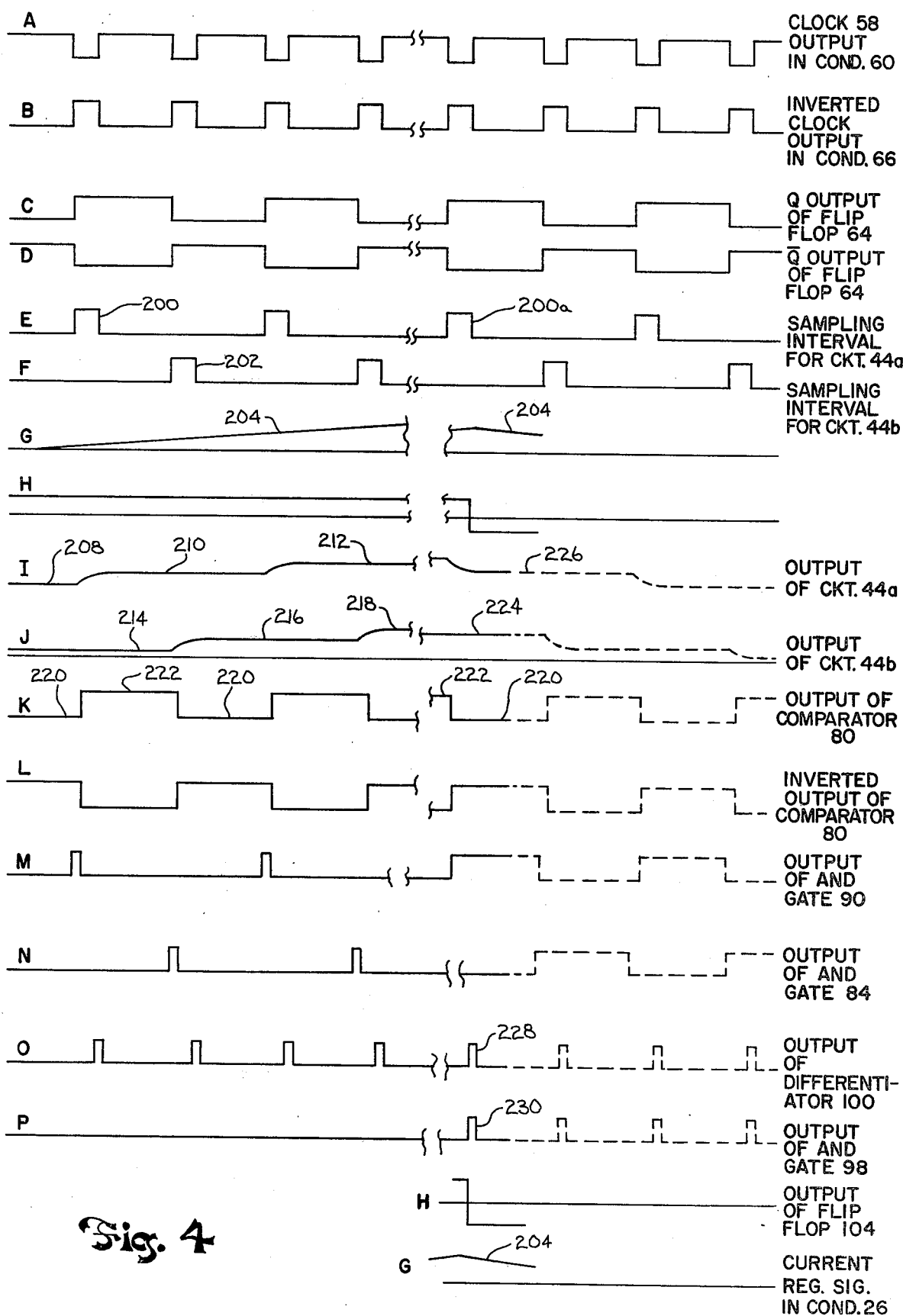

POWER MAXIMIZATION CIRCUIT

BACKGROUND OF THE INVENTION

1. Field of the Invention

The present invention relates to circuitry for maximizing the output power of a power supply.

2. Description of the Prior Art

The power provided by a power supply is the product of the voltage across the output terminals and the current appearing at those terminals.

Typically, the output voltage of the power supply decreases to a greater or lesser extent as the current increases to provide a "droop" to the graphic representation of the relationship between the output voltage and current. See FIG. 1. The graph of output voltage and current will change both in magnitude and shape as the result of independent variables applied to the power supply. For example, the output voltage of a photovoltaic solar cell is a function of temperature while the current is a function of illumination. Power supplies energized by other types of geophysical energy, as well as by other means, exhibit other variations in voltage and current output characteristics.

It is often desired to maximize the power output of a power supply. For example, in a power supply with a finite amount of power, such as a battery or fuel cell, one may wish to extract the stored power at a maximum rate. To accomplish output power maximization, the magnitude of one of output voltage or output current is usually made variable and adjusted to a magnitude which maximizes the output power. For example, in the case of a battery, the current is usually varied. Given the droop in the voltage-current relationship of a power supply, the relationship of output power to the output current resembles a bell-shaped curve. At high voltage and low current, output power is low. As the output current increases, output power similarly increases up to the point at which the voltage begins to droop whereupon the power output decreases. See FIG. 2. To maximize power, an output current is thus selected which corresponds to a value $Im_1$ which provides maximum power output.

Time varying changes in the relationship of output voltage to output current, because of independent variables related to the power supply changes the relationship of output power to the output current or voltage as shown by the dotted lines in FIG. 2 which graphs output power with respect to output current. The current level which provides a maximum power is altered, as from $Im_1$ to $Im_2$.

The changes in relationship of output power to output current or voltage require that any workable scheme of power maximization provide regulating circuitry for establishing the output current or voltage so as to produce maximum power output and for adjusting magnitude of the variable quantity to a magnitude which produces that maximum power output.

The design and operation of such regulating circuit is rendered difficult by the absence of any readily identifiable phenomenon, such as a polarity reversal, to identify when maximum power output conditions exist. For this reason, a technique known as "dithering" is restored to. In this technique, minor variations—increases and decreases—are made to the output current or voltage and the corresponding variations in power ascertained, as by sensing phase relationships between the power and the output current or voltage. If for example, current is used as the variable quantity and the current is at a value corresponding to maximum power output, both increases and decreases in the current will result in decreases in output power. If the current is at some other value, for example less than that required for maximum power conditions, decreases in the current will result in decreases in power and vice versa, indicating that the output current is less than a value corresponding to maximum power output. The regulator then increases the current until the maximum power output condition is obtained.

Obtaining power maximization by dithering presently suffers several drawbacks. One is its theoretical and practical inefficiency due to the fact that under conditions other than maximum power conditions, the current or voltage is being adjusted in a direction opposite to that required for maximum power at least half of the time. Further, there is a limit to the rate at which the magnitude of the current or voltage can be altered in moving the maximum power condition. This rate limitation is typically 1/5th, 1/10th, or some other fraction of the dithering rate and slows the response of the control in establishing the maximum power output condition.

SUMMARY OF THE PRESENT INVENTION

It is therefore, the object of the present invention to provide improved circuitry for maximizing the power output of a power supply.

The gist of the present invention is to provide circuitry in which the magnitude of the voltage or current is varied in a given magnitude direction without dithering, as long as periodic sampling of the power output of the power supply indicates that such variation continues to lead to conditions of increasing output power. The variation in current or voltage magnitude is reversed only when the sampling indicates that continued variation in the former direction is leading to decreases in output power. A dithering action resembling conventional power maximization circuitry occurs only at maximum power output conditions.

The power maximization circuit includes a clock means for generating a pulse train timing signal. A first flip-flop is coupled to the clock means for alternately operating a pair of switches. The switches are connected in the inputs of a pair of sample and hold circuits which alternately and successively sample the output power of the power supply and provide corresponding output signals. A comparison means is coupled to the sample and hold circuits and provides an output signal, the logic condition of which is indicative of increases or decreases in the output power of the power supply. Coincidence gating means operable by the comparison means and the first flip-flop drive a second flip-flop which, in turn, operates control signal generating means, such as an integrator, for altering the controlling signal to the power supply so as to alter the output voltage or current in a direction to produce maximum power.

BRIEF DESCRIPTION OF THE DRAWING

FIG. 4 is a series of graphs showing the operation of the circuitry shown in FIG. 3.

DETAILED DESCRIPTION OF THE PREFERRED EMBODIMENT

Figure 1:
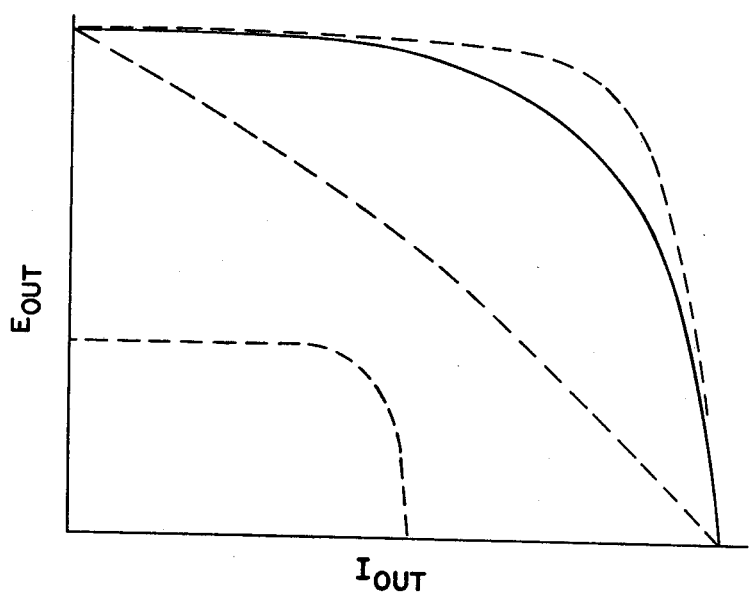
FIG. 1 is a graph showing output current and voltage characteristics for a power source.

FIG. 1 shows the relationship between the output voltage across the output terminals of a power source and the output current passing through the terminals. As noted, the output voltage typically decreases, or droops, with increases in output current. The shape and magnitude of the graph depends on the characteristics of the power supply and on independent variables applied to the power supply. As shown in FIG. 1, the graph of output voltage with respect to current may assume a variety of configurations.

Figure 2:
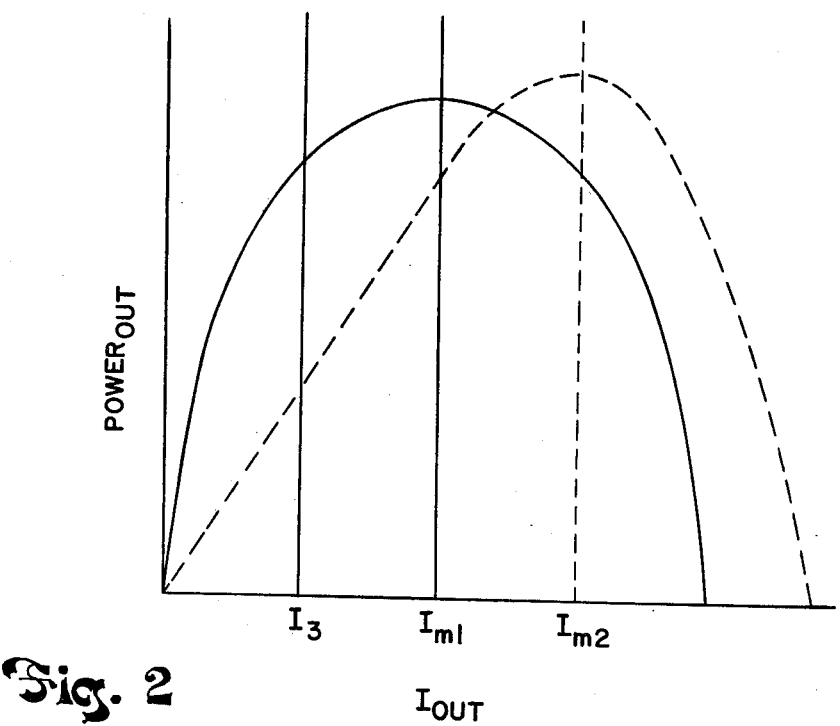
FIG. 2 is a graph showing the relationship between output power and output current for a power source.

FIG. 2 is a graph showing the relationship between output power of a power source and a variable one of output voltage or current. Output current is used as the variable quantity in FIG. 2. Because of the droop in the output characteristic of the power source, the graph of FIG. 2 often resembles a bell curve. High voltage but low current, at or near the origin of the graph, provides low output power. As current increases, output power increases until the voltage begins to decrease due to the droop, after which the output power again decreases. There is thus a current $Im_1$ at which maximum output power is obtained. As the output voltage and current graph shown in FIG. 1 changes, the shape of the power to current graph changes, as shown in FIG. 2. The current at which main output power is obtained also changes, as from current $Im_1$ to $Im_2$.

Figure 3:
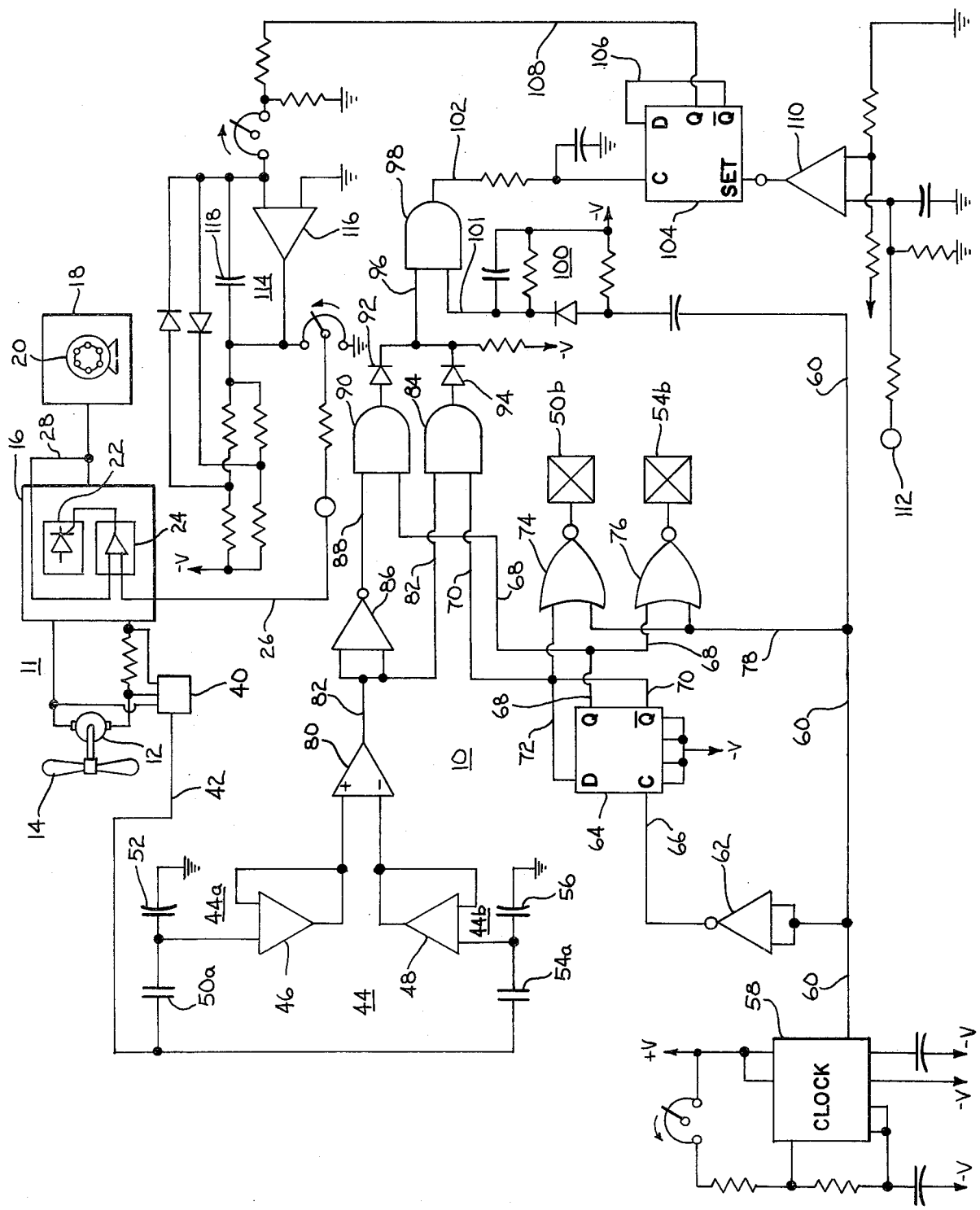
FIG. 3 is a general schematic diagram showing the power maximization circuit of the present invention.

FIG. 3 shows the power maximization circuit 10 of the present invention in schematic form. The circuitry is illustratively shown in connection with a power source including a D.C. generator 12 driven by windmill 14. Power source 12 is coupled to an inverter 16 which converts the direct current of the generator to alternating current for supply to load 18 which may, for example, comprise A.C. motor 20.

It is desired to control the output of power supply 12 so that maximum power is obtained from the generator under the diverse conditions produced by variations of the wind. As noted, supra, either the voltage across the power supply or the current going through the power supply may be varied to provide maximization. In the exemplary embodiment shown in FIG. 3, a current is utilized as the controlled quantity. The magnitude of the current may be controlled as by a thyristor means, shown diagrammatically as 22, operable by current regulator 24 responsive to a current control signal in conductor 26 and a feedback signal in conductor 28. The current control signal in conductor 26 is provided by power maximization circuit 10.

The power output of power supply 12 is sensed by watt meter 40 connected across the output of power supply. Watt meter 40 may cmprise the circuitry shown in applicant's co-pending application Ser. No. 773,070, filed Feb. 28, 1977 now U.S. Pat. No. 4,074,194 which provides a signal proportional to power in conductor 42.

Conductor 42 is connected to the input circuitry 44 of power maximization circuit which contains a pair of sample and hold circuits 44a and 44b. Sample and hold circuits periodically sample the output power level of power supply 12 and provide output signals corresponding to that level. Sample and hold circuit 44a comprises a unity gain operational amplifier 46 connected through switch contacts 50a to conductor 42 and to capacitor 52. Sample and hold circuit 44b comprises a unity gain operational amplifier 48 connected through switch contacts 54a to conductor 42 and to capacitor 56. Switch contacts 50a and 54a are alternately closed to sample the power output level of power supply 12.

Switch contacts 50a and 54a are operated responsive to a timer or clock 58 which provides a pulse train output in conductor 60. The signal in conductor 60 is inverted by inverting amplifier 62 and provided to the clock input of flip-flop 64 in conductor 66. Flip-flop 64 provides a pair of output signals, Q and $\overline{Q}$, in conductors 68 and 70, respectively, the signal condition of one being the inverse of the other. The data input, termed D, to flip-flop 64 is provided in conductor 72. Flip-flop 64 may be of the DQ type in which the data signal (D) in conductor 72 is transferred to the Q output in conductor 68 each time a clock pulse is applied to the flip-flop. As shown in FIG. 3, in circuitry 10, the $\overline{Q}$ output in cnductor 70 may be connected to the data input conductor 72 so that both the Q and $\overline{Q}$ outputs change state with each change of logic condition of the signal at the clock input. The flip-flop thus becomes a divide-by-two element.

The outputs of flip-flop 64 are also provided to NOR gates 74 and 76. Specifically, conductor 68 is connected to one input of NOR gate 76 while conductor 70 is connected to one input of NOR gate 74. The other input to NOR gates 74 and 76 comprise the clock signal in conductor 78. The outputs of NOR gates 74 and 76 are provided to switch actuators 50b and 54b, respectively, to alternately close and open switch contacts 50a and 54a. While shown as contacts for exemplary purposes in FIG. 3, it will be appreciated that the switch elements comprising contacts 50a and actuator 50b and cntacts 54a and actuator 54b are preferably solid state semi-conductor analog switching elements.

The output of sample and hold circuit 44a and 44b are provided to the non-inverting and inverting inputs, respectively, of comparator 80 which provides a digital type output signal in conductor 82, the signal cndition of which is indicative of the relative magnitude of the outputs of sample hold circuits 44a and 44b.

The output signal of comparator 80 in cnductor 82 is provided to one input of AND gate 84 and through inverter 86 and conductor 88 to one input of AND gate 90. The other input to AND gate 84 comprises the $\overline{Q}$ output signal of flip-flop 64 in conductor 70. The other input to AND gate 90 comprises the Q output of flip-flop 64 in conductor 68.

The outputs of AND gates 84 and 90 are provided through diodes 92 and 94 to conductor 96 and the input of AND gate 98. The other input to AND gate 98 is contained in conductor 101 and comprises the clock pulse in conductor 60 differentiated by differentiator 100 to a short duration pulse upon the rise of the clock pulse train. The output signal of AND gate 98 is provided in conductor 102 to the clock input of flip-flop 104. The Q output of flip-flop 104 is provided in cnductor 106 to the data input of the flip-flop. The $\overline{Q}$ output of flip-flop 102 is provided in conductor 108. The set input of flip-flop 104 is connected to shut down circuit 110 which disables flip-flop 104 and power maximization circuit 10 in the event the voltage across power supply 12 drops to a level so low as to make power maximization futile. Terminal 112 may be connected to power source 12 for this purpose.

Conductor 108 is connected to the input of an integrator 114 containing a differential amplifier 116 having capacitor 118 in the feedback path. The output of integrator 114 is provided in conductor 26 as the reference signal to current regulator 24.

The operation of power maximization circuit 10 is as follows. Clock 58 provides the pulse train output shown in graph A of FIG. 4 in conductor 60. The signal in conductor 60 is inverted by inverter 62 to provide the signal shown in the graph B to flip-flop 64. The Q and $\bar{Q}$ outputs of flip-flop 64 in conductors 68 and 70, respectively, are shown in graphs 4C and D. The output signals of flip-flop 64 and the clock signal in conductor 78 operate NOR gates 74 and 76 to provide the sampling intervals shown in graphs E and F. Graph E shows the closure of switch contacts 50a during time periods of 200 while graph F shows the closure of switch contacts 54a during time periods 202. During the closure of the switch contacts, the signal in conductor 42, indicative of the output power level of power supply 12, is alternately sampled by sample and hold circuits 44a and 44b. The sampled power level is then held in the sample and hold circuits 44a and 44b when the switch contacts are open.

It may be assumed that the output current of power supply 12 is the controllable quantity, that the output power-output current relationship is as shown in solid lines in FIG. 2, that the magnitude of the current resembles the signal level $I_3$ in FIG. 2 and that the current is being increased towards the magnitude $Im_1$ so that the power output of power supply 12 is similarly increasing. The operation of power maximization circuit 10 under these conditions is shown on the left hand side of FIG. 4.

As hereinafter described in detail, graph G of FIG. 4 shows a linearly increasing signal 204 which is applied to current regulator 24 in conductor 26 to increase the output current of power supply 12. The signal in conductor 26 is provided by integrator 114 as a result of a constant magnitude signal in conductor 108 shown in graph H.

Under the foregoing conditions of increasing power, with each sampling, the power level of power supply 12 will be greater than that of the previous sampling.

Graphs I and J of FIG. 4 show the operation of sample and hold circuits 44a and 44b and the output signals applied to comparator 80. In connection with FIG. 4I, the graph 208 shows the power output level of power supply 12 being held by sample and hold circuit 44a from the previous sampling. At the initiation of sampling interval 200, switch contacts 50a are closed to apply the signal in conductor 42 to capacitor 52. Since, as noted above, the power output of power supply 12 is increasing, the increased signal in conductor 42 will commence to charge capacitor 52 to a correspondingly higher signal level 210 as shown in graph I. The increased signal 210 is retained on capacitor 52 when switch contacts 50a are opened to retain the increased power signal. A similar operation occurs during the successive sampling period 200 to produce signal 212.

The operation of sample and hold circuit 44b during sampling intervals 202 is analogous to that of sample and hold circuit 44a to produce signals 214, 216 and 218, shown in graph J.

The signals from sample and hold circuit 44a and sample and hold circuit 44b shown in graphs I and J of FIG. 4 are provided to the non-inverting and inverting inputs of comparator 80, respectively, the output signal of which is shown in graph K. At the commencement of graphs I, J, and K, signal 214 from sample and hold circuit 44b, the most recently received sampling of the power output level of power supply 12, is greater than signal 208 from sample and hold circuit 44a, the immediately preceeding sampling. Since the larger signal is applied to the inverted output of comparator 80, its comparison action provides a low signal level at the output of comparator 80, as indicated by signal 220 in graph K.

During the sampling period 200, as soon as capacitor 52 in sample and hold circuit 44a charges to a level above the level of signal 214, the larger signal to comparator 80 becomes applied to the non-inverting input. This causes the output of comparator 80 to change to the high level 222 shown in graph K. It will be appreciated that since it takes a finite time for capacitor 52 to charge to a level in excess of signal 214, the alteration of the output signal of comparator 80 occurs slightly after the commencement of sampling interval 200, as shown in graph K.

In the next sampling interval 202, switch contacts 54a are closed to provide the increased power output signal in conductor 42 to capacitor 56 and the output of sample and hold circuit 44b. As soon as the output signal of sample and hold circuit 44b exceeds that of sample and hold circuit 44a the relative magnitude of the input signals to comparator 80 is reversed, returning the output signal to the low signal level 220. The output comparator 80 is thus the square wave signal shown in graph K of FIG. 4.

The inverted comparator output signal provided in conductor 88 by inverter 86 is shown in graph L.

The inverted comparator output signal in conductor 88 is provided to one input of AND gate 90, the other input signal to which is the Q output of flip-flop 64 in conductor 68. The output signal of comparator 80 in conductor 82 is provided to one input of AND gate 84, the other input to which is the $\bar{Q}$ output of flip-flop 64 in conductor 70.

The output signals of AND gates 90 and 84 which are provided to conductor 96 and one input of AND gate 98 are shown in graphs M and N. The coincidence conditions necessary to provide an output signal exist only during the short delays in the alteration of the signal shown in graphs K and L required to charge capacitors 52 and 56 in sample and hold circuits 44a and 44b. Other than for these short time periods, the input signals to AND gates 84 and 90 are out of coincidence so that no other output signals are produced by the AND gates.

The output of differentiator 100 conductor 101 to AND gate 98 is shown in graph O. In as much as there is no coincidence of the signals shown in graphs M and N, from AND gates 90 and 84 with the clock produced signal from differentiator 100 shown in graph O there is no output signal from gate 98 in conductor 102 to flip-flop 104. The output signal of flip-flop 104 in conductor 108 to integrator 114, as shown in graph H continues to be applied to integrator 114. The integration of this constant magnitude input signal continues to provide a linearly increasing signal 204 in conductor 26, shown in graph G, which increases the output current of power supply 12 toward that required for maximum output power.

The above operation continues until further increases in the output current magnitude of power supply 12 cause decreases in the output power level of power supply 12, rather than increases. This may occur for several reasons. If the graph of the relationship between output current and output power remains the same in magnitude and shape, eventually the current value $Im_1$ corresponding to maximum power will be reached and exceeded. Under these conditions, further increases in output current result in decreases in output power of power supply 12. Or, the shape of the graph relating output power to output current may change, as a result of independent variable applied to the power supply so that increases output current no longer produce increases in output power. The operation of power maximization circuit 10 under such circumstances is shown in the right hand side of FIG. 4 in which the operation is described under conditions in which the output current has exceeded the level $Im_1$.

In graph J of FIG. 4, the output power level of power supply 12 determined at the most recent sampling is represented by the signal 224. Due to the decreasing output power of power supply 12, when the next sampling is made during interval 200a, a signal 226, smaller than signal 224, appears at the output sample and hold circuit 44a. See graph I of FIG. 4. This reversal of the relative magnitudes of the outputs of sample and hold circuits 44a and 44b alters the output of comparator 80 from the high level condition 222 to the low level condition 220 (see graph K) and provides a corresponding alteration of the inverted output of comparator 80 and conductor 82 (see graph L). It will be noted that the condition of the signal shown in the right hand side of graphs K and L is inverted with respect to the signal shown in the left hand side of the graphs. These outputs of comparator, when taken with the Q and Q outputs of flip-flop 64 provide the output signals from AND gates 90 and 84 to AND gate 98 shown in the right hand side of graphs M and N.

When pulse 228 is also provided to AND gate 98, the coincidence condition necessary to provide an output signal from the AND gate for the duration of pulse 228 exists. The output of AND gate 98 is pulse 230 shown in graph P.

Pulse 230 is applied to a flip-flop 104 to reverse the polarity of the output signal in conductor 108 to integrator 114. This causes the integrator to commence to decrease the reference signal 204 in conductor 26 to current regulator 24.

The decrease in the current reference signal 204 causes a corresponding decrease in the output current of power supply 12 so that the next sampling of the output power from power supply 12 will thus indicate an increased power condition. The operation of the power maximization circuit then reverts to one analogous to that shown on the left hand side of FIG. 4.

As the reference signal 204 in conductor 26 and the output current of power supply 12 decreases, the maximum power condition is reached and passed so that the power maximization circuit 10 again senses a decreasing output power condition and the operation of the power maximization circuit reverts to that shown in the right hand side of FIG. 4. A pulse is then generated to flip-flop 104 to provide an output signal which causes integrator 114 to again increase the current regulating signal 204 in conductor 26 and the output current of power supply 12. Depending on the shape of the output power-output current graph and the sampling rate, this reversal may occur as a result of the next succeeding sampling interval or some subsequent sampling interval.

The operation of power maximization circuit 10 at the maximum power condition resembles dithering in that the output current is periodically and alternately increased and decreased to detect the maximum power condition of power supply 12 and to maintain the output current at a magnitude which it maintains the maximum power condition. In all other conditions, power maximization circuit 10 establishes a current variation which results in increased power from power supply 12 and continues that current variation, without dithering, for as long as it continues to produce increased output power. Only when further variations of the output current in the same direction result in decreased power is the direction of output current variation reversed.

The operation of power maximization circuit 10 is thus in contrast to prior art controls which continuously dither throughout all operating sequences of the control with the resulting inefficiencies and slow response times.

Various modes of carrying out the invention are contemplated as being within the scope of the following claims particularly pointing out and distinctly claiming the subject matter which is regarded as the invention.

I claim:

1. A power maximization circuit for altering at least on one of the output voltage and current of a power supply to provide maximum output power from the supply, said power supply having means providing a signal indicating output power and means responsive to a control signal for altering the current or voltage, said circuit comprising:

sampling means including a pair of sample and hold circuits for periodically sampling the output power signal of said power supply and providing a pair of signals corresponding to successive samplings;

comparison means coupled to said sample and hold circuit for comparing the relative magnitude of the pair of signals from said sampling means and for providing a logic output signal, the logic condition of which is indicative of said relative magnitudes and of increases and decreases in output power of the supply;

timing means coupled to said sampling means and providing an output signal of predetermined timing, logic condition detection means including coincident signal gating means coupled to said comparison means and to said timing means for detecting the logic condition of the comparison means output signal by the coincidence of that signal and the output signal of said timing means; and means coupled to said logic condition detection means for establishing the power supply control signal in a direction obtaining maximum power output responsive to changes in the logic condition of the comparison means output signal.

2. The power maximization circuit of claim 1 wherein said logic condition detection means provides a constant magnitude output signal, the polarity of which is indicative of the logic condition of the comparison means output signal and wherein said means for establishing the power supply control signal comprises an integrator connected to said logic condition detection means.

3. The power maximization circuit according to claim 1 further including a clock means for generating a pulse train timing signal; first bi-stable means coupled to said clock means for providing a pair of pulse train output signals having opposite signal conditions; a pair of switch means coupled to said first bi-stable means and to said clock means and operable by said pair of output signals and said pulse train timing signal for alternately providing closure of each of said switch means; wherein said pair of sample and hold circuits of said sampling means are couplable through said switch means to said power supply output signal for alternately and successively sampling the output power signal and providing a pair of signals corresponding thereto; and wherein said coincident signal gating means of said logic condition detection means is responsive to the output signal of said comparison means, the output signal of said first bi-stable means, and said clock pulse train signal for providing a coincidence responsive output signal indicative of the logic condition of the comparison means output signal; said logic condition detection means including second bi-stable means coupled to said coincident signal gating means and responsive to said coincident signal gating means output signal for altering its output signal state, said second bi-stable means being coupled to said power supply control signal establishing means for establishing said control signal.

* * * * *